United States Patent [19]

Kassai

[11] 4,023,825

[45] May 17, 1977

[54] STROLLER

[75] Inventor: Kenzo Kassai, Osaka, Japan

[73] Assignee: Kassai Co., Ltd., Osaka, Japan

[22] Filed: Oct. 29, 1975

[21] Appl. No.: 626,920

[30] Foreign Application Priority Data

Nov. 2, 1974 Japan .......................... 49-126813

[52] U.S. Cl. .............................. 280/649; 280/650; 296/28 B

[51] Int. Cl.² .......................................... B62B 7/06

[58] Field of Search .......... 280/641, 642, 644, 647, 280/649, 650; 296/1 B, 28 B

[56] References Cited

UNITED STATES PATENTS

| | | | |
|---|---|---|---|
| 2,220,150 | 11/1940 | Goldman | 280/641 |
| 2,398,863 | 4/1946 | Sides | 280/641 |
| 2,451,985 | 10/1948 | Sides | 280/641 X |
| 3,917,302 | 11/1975 | Gebhard | 280/650 X |

*Primary Examiner*—Joseph F. Peters, Jr.
*Assistant Examiner*—Michael J. Forman
*Attorney, Agent, or Firm*—Wenderoth, Lind & Ponack

[57] ABSTRACT

A stroller has a pair of parallel front legs, an inverted U-shaped handle rod foldably connected to the upper ends of the front legs, a pair of parallel rear legs interconnected by a handrest and pivoted to specified portions of the front legs crosswise respectively, a pair of stays bent at an obtuse angle and pivoted at their upper ends to the handle rod, a transverse rod interconnecting the lower ends of the stays, a pair of links each having one end pivotally supported by the transverse rod and the other end pivoted to each of the rear legs at a specified position near the lower end of the rear leg, a U-shaped footrest pivotally supported at its opposite ends by the transverse rod and pivoted at specified portions to the front legs near the lower ends thereof, and locking members interconnected by a connecting rod and pivoted to specified midportions of the rear legs respectively. Each of the locking members is provided with a spring for pressing the locking member against the transverse rod engaged in a cutout of the locking member when the stroller is in condition for use. The front legs and rear legs are fixedly provided at their lower ends with transverse wheel shafts carrying front wheels and rear wheels respectively.

3 Claims, 5 Drawing Figures

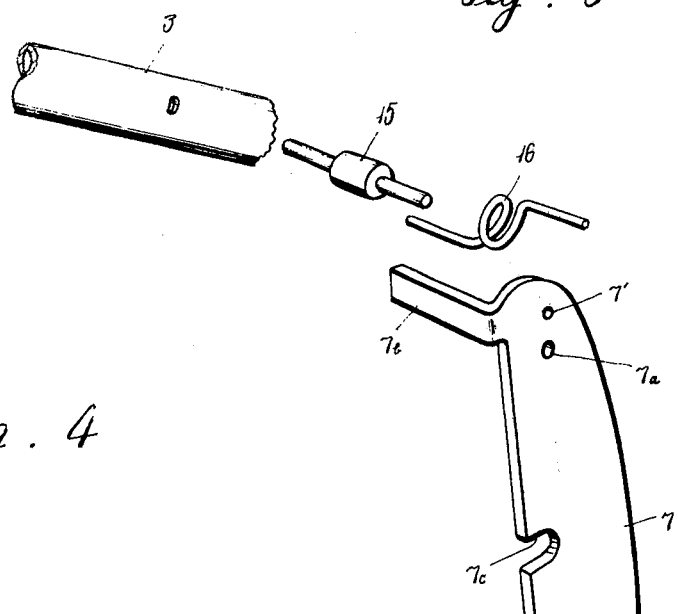
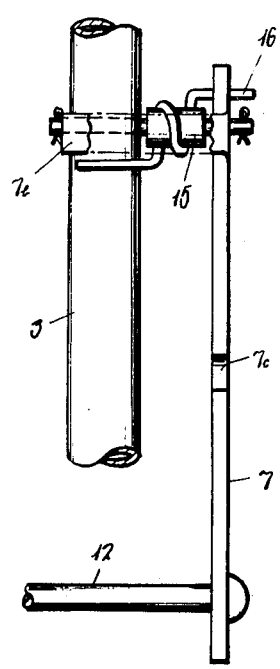
Fig. 3
Fig. 4

STROLLER

BACKGROUND OF THE INVENTION

It is desired that strollers fulfil the following requirements. First, the main body of the stroller must be collapsible to a flat shape. Second, it must be easily collapsible and unfoldable to shape by anybody. Third, it must be free of the possibility of being inadvertently collapsed during use.

Conventional strollers are bulky, difficult to collapse and inconvenient to carry around for example in department stores, supermarkets, stations, etc., giving passerby trouble. Strollers are not adapted for carrying on a bus, train or the like and, when carried thereon, they are in fact troublesome to passengers. Moreover, they are inconvenient because of the large space needed for storage when out of use.

SUMMARY OF THE INVENTION

The present invention relates to a collapsible stroller.

The object of this invention is to overcome the foregoing drawbacks of conventional strollers and to provide an ideal stroller fulfilling the three requirements described above.

To collapse or unfold the stroller of this invention to the usual condition for use, locking members are turned against the action of springs to disengage a transverse rod from the cutouts of the locking members. When a handle rod is thereafter turned downward and folded, stays supporting the handle rod move down along with the transverse rod, raising a footrest frame and links toward each other, with the result that front legs and rear legs also rise toward each other into a collapsed state. The collapsed stroller can be unfolded to shape for use in a manner reverse to the above by raising the handle rod.

BRIEF DESCRIPTION OF THE DRAWINGS

FIG. 3 is an exploded perspective view on an enlarged scale showing the principal parts of the locking means for the stroller;

FIG. 4 is a plan view on an enlarged scale showing the principal parts of the locking means for the stroller.

DESCRIPTION OF THE PREFERRED EMBODIMENT

Figure 1:
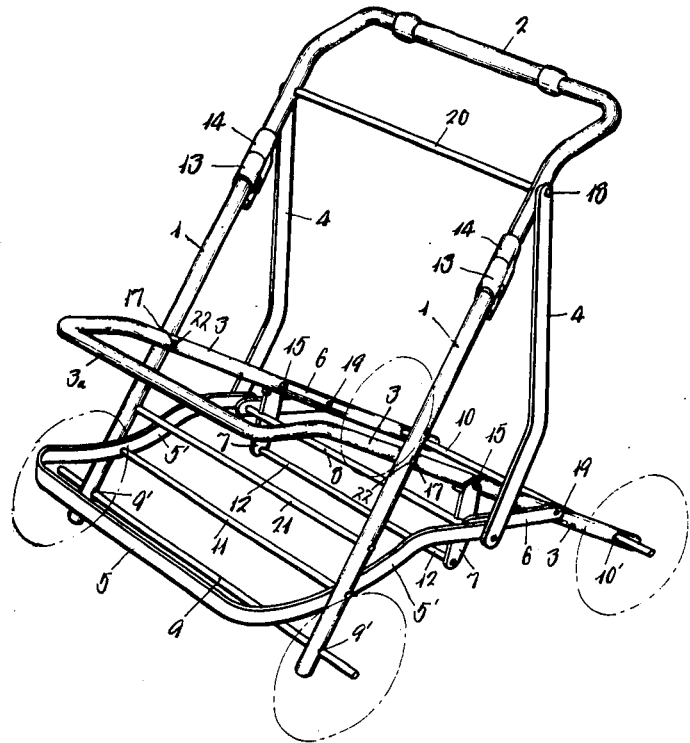
FIG. 1 is a perspective view showing the frame of the stroller during use.
Figure 2:
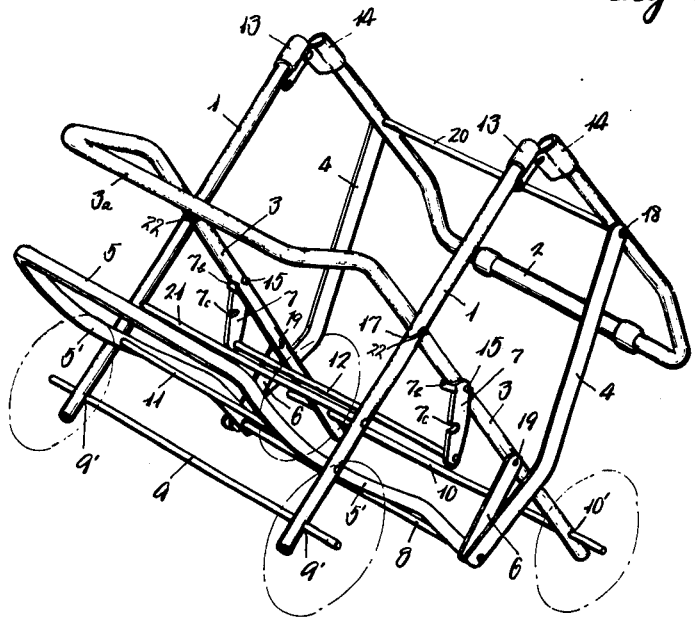
FIG. 2 is a perspective view showing the frame in a partially collapsed state.
Figure 5:
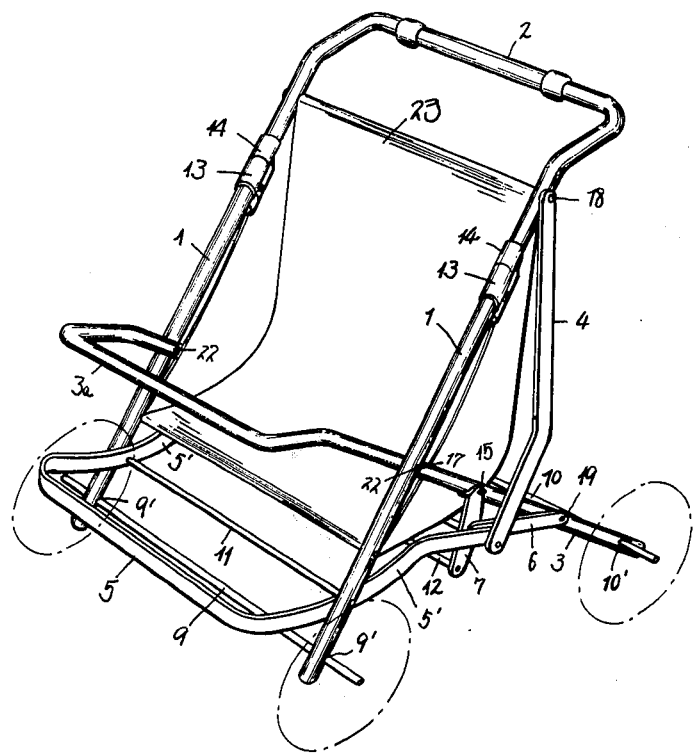
FIG. 5 is a perspective view showing the stroller of this invention during use.

With reference to the accompanying drawings, an embodiment of this invention will be described below.

A pair of front legs 1 disposed parallel to each other are fixedly provided with a transverse wheel shaft 9 at their lower ends. Each of the front legs 1 has a connector 13 secured to its upper end. Connectors 14 pivotably connected to the connectors 13 respectively are fixed to the opposite ends of an inverted U-shaped handle rod 2. The upper end of a stay 4 bent at an obtuse angle is pivoted to each of the side portions of the handle rod 2 at a specified position. The lower ends of the stays 4 are interconnected by a transverse rod 8. A U-shaped footrest frame 5, the opposite ends of which are pivoted on the transverse rod 8, is pivotally supported at a specified position of each of its side bars 5' by a rod 11 extending between specified portions of the front legs 1 near the lower ends thereof. Rear legs 3 are integrally connected with each other by a forwardly bent upper end serving as a handrest 3a and are pivoted, each at a midportion, to specified portions of the front legs 1 crosswise as indicated at 22 by screws 17. A transverse wheel shaft 10 is fixed in holes 10' in the lower ends of the rear legs 3. Slightly below the pivoted position 22 of each of the rear legs 3, a locking member 7 is pivoted to each leg 3 by a pin 15. Near the lower end of each of the rear legs 3, a link 6 is pivoted at its one end to the leg 3 by a screw 19. The other end of the link 6 is pivoted to one end of the rod 8. The lower ends of the pair of locking members 7 are interconnected by a rod 12. The locking member 7 has formed, in the front edge of its midportion, a cutout 7c in which the connecting rod 12 engages. A bent spring 16 fitting around the pin 15 has one end engaged in a bore 7' formed in the locking member 7 close to its upper end and the other end bearing against the under surface of the rear leg 3. A stop 7b projecting from the front edge of the locking member 7 and positioned closed to its upper end is always held in contact with the under surface of the rear leg 3 by the spring 16. The member 7 has a hole 7a for the pin 15.

An upper body support 20 transversely extends between and is secured to specified opposite side portions of the handle rod 2, while a lower body support 21 transversely extends between and is fixed to specified midportions of the front legs 1. Indicated at 7d is a circular arc edge defining the lower end of the locking member 7. Indicated at 23 is a body seat on which a baby sits. The upper edge of the body 23 is connected to the body support 20 and the lower edge to the lower support 21.

To collapse the stroller frame from the condition for use as shown in FIG. 1, the locking members 7 are turned backward against the action of the bent springs 16 to disengage the transverse rod 8 from the cutouts 7c. When the handle rod 2 is thereafter turned downward and folded, the stays 4 and the transverse rod 8 move down, raising the footrest frame 5 and the links 6 toward each other, with the result that the front legs 1 and rear legs 3 pivoted to each other crosswise also rise to bring the wheel shafts 9 and 10 toward each other. Thus the frame is moved to its collapsed state.

Conversely to unfold the collapsed frame for use, the folded handle rod 2 is raised into alignment with the front legs 1, causing the stays 4 and connecting transverse rod 8 to be moved upward. At this time, the rod 8 comes into contact with the circular arc edges 7d at the lower ends of the locking members 7 and then slides upward along the edges 7d and the front edges of the locking members 7 to engage in the cutouts 7c. Consequently the footrest frame 5 and links 6 incline in directions away from each other, while the front legs 1 and rear legs 3 unfold, moving the wheel shafts 9 and 10 away from each other. The stroller frame is now ready for use as shown in FIG. 1.

The stroller of this invention described above has various advantages. It is easy to collapse and unfold, so that when collapsed, it is convenient to carry around in a crowded place as in a department store, bus or the like. Moreover, it is compact for storage and is in no way inadvertently collapsible during use.

What is claimed is:

1. A collapsible stroller frame comprising a pair of parallel front legs, a wheel shaft extending transversely between the lower ends of the legs and fixed thereto, an inverted U-shaped handle rod foldably connected to the upper ends of the front legs, a pair of parallel rear legs extending crosswise of and foldably pivoted to midportions of the front legs, a further wheel shaft extending transversely between the lower ends of the rear legs and fixed thereto, a pair of stays bent at an obtuse angle and pivoted at their upper ends to side portions of said handle rod, a transverse rod interconnecting the lower ends of the stays, a pair of links each pivotally connecting the respective ends of the transverse rod to the corresponding rear legs at a position near the lower ends of the rear legs, a U-shaped footrest having its opposite ends pivotally mounted on said transverse rod and pivoted at midportions of the side bars thereof to the front legs near the lower ends thereof, said frame being collapsible from an erected position to a collapsible position, and locking means engageable between at least two of the pivotally connected parts of said frame for locking said frame in the erected position.

2. A collapsible stroller as defined in claim 1 wherein said locking means comprises pins extending transversely through midportions of the rear legs, respectively, a pair of locking members having the upper ends thereof pivotally supported on said pins, a connecting rod extending transversely between and secured to the lower ends of the locking members, each of the locking members having a bore close to its upper end and a cutout in the front edge thereof in which the transverse rod is engageable, the lower end of the locking members being in the shape of an arc, a stop projecting from the front edge of the upper end of each of the locking members, a bent spring fitted around each pin and having one end engaged in the bore in the corresponding locking member and the other end bearing against the under surface of the corresponding rear leg for holding the corresponding stop in pressing contact with the under surface of the rear leg.

3. A collapsible stroller comprising a pair of parallel front legs, a wheel shaft extending transversely between the lower ends of the legs and fixed thereto, wheels on the ends of said wheel shaft, an inverted U-shaped handle rod foldably connected to the upper ends of the front legs, an upper body support extending between the sides of said handle rod, a pair of parallel rear legs extending crosswise of and foldably pivoted to midportions of the front legs, a further wheel shaft extending transversely between the lower ends of the rear legs and fixed thereto, further wheels on the ends of said further wheel shaft, a pair of stays bent at an obtuse angle and pivoted at their upper ends to side portions of said handle rod, a transverse rod interconnecting the lower ends of the stays, a pair of links each pivotally connecting the respective ends of the transverse rod to the corresponding rear legs at a position near the lower ends of the rear legs, a U-shaped footrest having its opposite ends pivotally mounted on said transverse rod and pivoted at midportions of the side bars thereof to the front legs near the lower ends thereof, a lower body support extending between the sides of said footrest, a body seat of flexible material connected between said upper and lower body support, said frame being collapsible from an erected position to a collapsible position, and locking means engageable between at least two of the pivotally connected parts of said frame for locking said frame in the erected position.

* * * * *